United States Patent [19]

Mueller, Jr.

[11] Patent Number: 4,715,012
[45] Date of Patent: Dec. 22, 1987

[54] ELECTRONIC TRACTOR CONTROL

[75] Inventor: Otto Mueller, Jr., Detroit, Mich.

[73] Assignee: Massey-Ferguson Services N.V., Curacao, Netherlands Antilles

[21] Appl. No.: 191,240

[22] Filed: Oct. 15, 1980

[51] Int. Cl.⁴ .............................................. G06F 15/20
[52] U.S. Cl. .................................... 364/900; 364/424
[58] Field of Search ............... 364/200, 900, 424, 551, 364/684, 424, 580, 300

[56] References Cited

U.S. PATENT DOCUMENTS

| | | | |
|---|---|---|---|
| 3,106,636 | 10/1963 | McIntyre et al. | 235/165 |
| 3,179,355 | 4/1965 | Pickering et al. | 244/14 |
| 3,835,819 | 9/1974 | Anderson, Jr. | 123/32 EA |
| 3,860,074 | 1/1975 | Maistrelli | 172/7 |
| 3,906,207 | 9/1975 | Rivere et al. | 235/150.2 |
| 3,961,546 | 6/1976 | Gilmore et al. | 74/866 |
| 4,013,875 | 3/1977 | McGlynn | 235/150.2 |
| 4,031,782 | 6/1977 | Miller et al. | 74/866 |
| 4,033,202 | 7/1977 | Ahlen et al. | 74/866 |
| 4,041,809 | 8/1977 | Dick et al. | 74/866 |
| 4,073,204 | 2/1978 | Dick | 74/866 |
| 4,082,013 | 4/1978 | Dornfeld et al. | 74/866 |
| 4,099,495 | 7/1978 | Kiencke et al. | 123/32 EB |
| 4,102,222 | 7/1978 | Miller et al. | 74/866 |
| 4,102,776 | 7/1978 | Stone | 208/64 |
| 4,109,772 | 8/1978 | Poore | 192/0.092 |
| 4,115,847 | 9/1978 | Osder et al. | 364/101 |
| 4,117,747 | 10/1978 | Windsor | 74/866 |
| 4,123,794 | 10/1978 | Matsumoto | 364/132 |
| 4,131,036 | 12/1978 | Ivey et al. | 74/866 |
| 4,140,031 | 2/1979 | Sibeud et al. | 74/866 |
| 4,148,231 | 4/1979 | Redzinski | 74/866 |
| 4,154,487 | 5/1979 | Vannini et al. | 303/106 |
| 4,155,277 | 5/1979 | Minami et al. | 74/866 |
| 4,157,124 | 6/1979 | Poore | 180/105 E |

(List continued on next page.)

FOREIGN PATENT DOCUMENTS 2508620 8/1975 Fed. Rep. of Germany .

OTHER PUBLICATIONS

30th Annual IEEE VTS Conference, Sep. 15–17, 1980, IEEE 80 CH 1601-4, pp. 1–6 & cover.
SAE Technical Paper Series 800167, "Electronic Control of Diesel Passenger Cars", Feb. 25–29, 1980.
Machine Design, p. 40, "Electronic Gear Shifter Simplifies Scraper Control".
Hitch-Tronic, Electronic-Hydraulic Hitch Control for Tractors from Bosch.

Primary Examiner—Thomas M. Heckler
Assistant Examiner—Tim Wiens

[57] ABSTRACT

A method and apparatus for controlling a plurality of subsystems (66, 70) associated with an agricultural vehicle such as a tractor. Examples of such subsystems in a tractor are hitch positioning, power take off (PTO), multiple range transmissions, differential lock, diesel fuel injection, and the like.

A unified control system is provided including a central control unit having a first microprocessor (56) and a plurality of subservient control units each having a microprocessor (58, 60). Each of the subservient control unit microprocessors (58, 60) are connected for controlling at least one subsystem (66, 70) and for sensing the operating conditions of at least a single subsystem (66, 70) using sensors (68, 72). The subservient control unit microprocessors (58, 60) are also connected to the central control unit microprocessor (56) which controls communication between the subservient control unit microprocessors (58, 60). Various control criteria, including desired relationships among various subsets of the conditions, are stored in memories associated with the microprocessors. The microprocessors cycle through a series of subroutines in which various subsets of conditions are compared with the target, or desired relationships. Control signals are generated by the microprocessors for controlling the individual subsystems to bring the conditions thereof to the targeted relationships. Such relationships include, but are not limited to engine advance characteristics as a function of engine RPM and torque, transmission shift points, criteria for overriding a draft control for hitch positioning, and the like.

9 Claims, 10 Drawing Figures

U.S. PATENT DOCUMENTS

| | | | |
|---|---|---|---|
| 4,181,944 | 1/1980 | Yamauchi et al. | 364/431 |
| 4,208,925 | 6/1980 | Miller et al. | 74/866 |
| 4,208,929 | 6/1980 | Heino et al. | 74/731 |
| 4,220,058 | 9/1980 | Petzold | 74/751 |
| 4,220,059 | 9/1980 | Mizuno et al. | 74/865 |
| 4,221,266 | 9/1980 | Fardal | 172/4 |
| 4,223,573 | 9/1980 | Franssen | 74/858 |
| 4,228,700 | 10/1980 | Espenschied et al. | 74/866 |
| 4,234,021 | 11/1980 | Clokie | 139/371 |
| 4,236,594 | 12/1980 | Ramsperger | 364/424 |
| 4,244,023 | 1/1981 | Johnson | 364/431 |
| 4,246,639 | 1/1981 | Carp et al. | 364/431 |
| 4,253,347 | 3/1981 | Mizuno et al. | 74/862 |
| 4,261,314 | 4/1981 | Graessley | 123/480 |
| 4,262,335 | 4/1981 | Ahlen et al. | 364/431 |
| 4,262,557 | 4/1981 | Grob et al. | 74/861 |
| 4,263,652 | 4/1981 | Henrich | 364/431 |
| 4,267,569 | 5/1981 | Baumann et al. | 364/431 |
| 4,376,298 | 3/1983 | Sokol et al. | 364/551 |

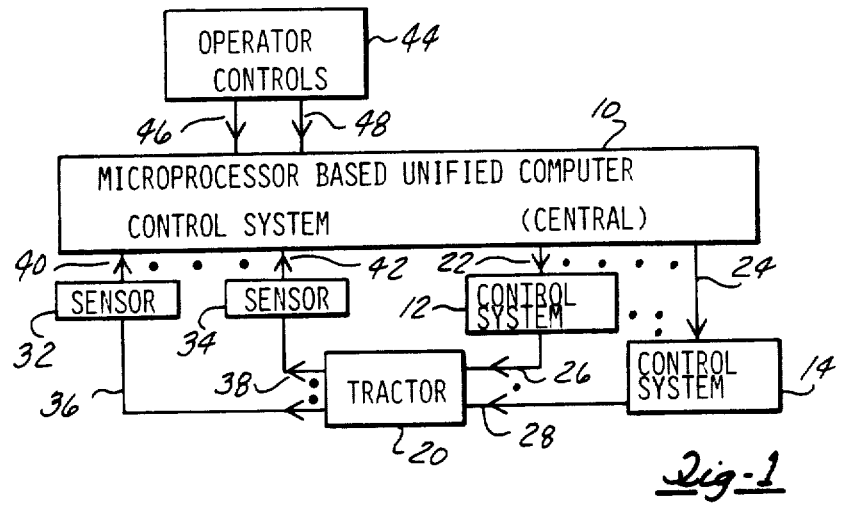
Fig-1
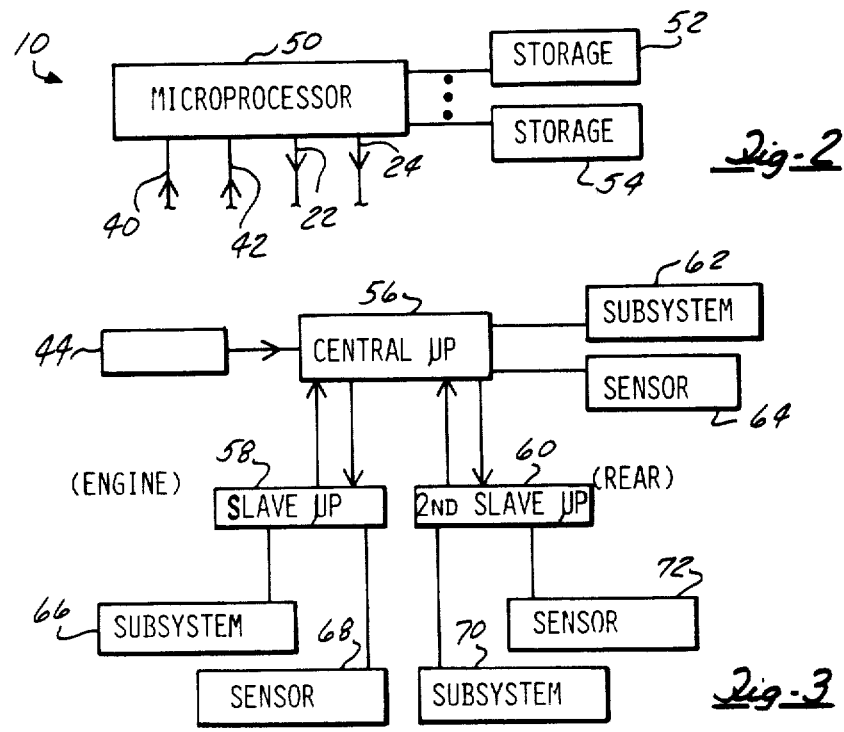
Fig-2
Fig-3

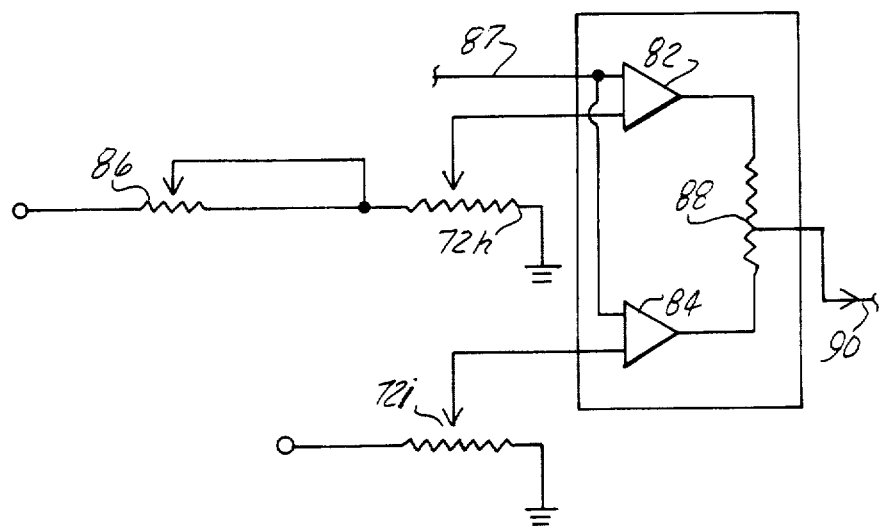
_Fig-5_
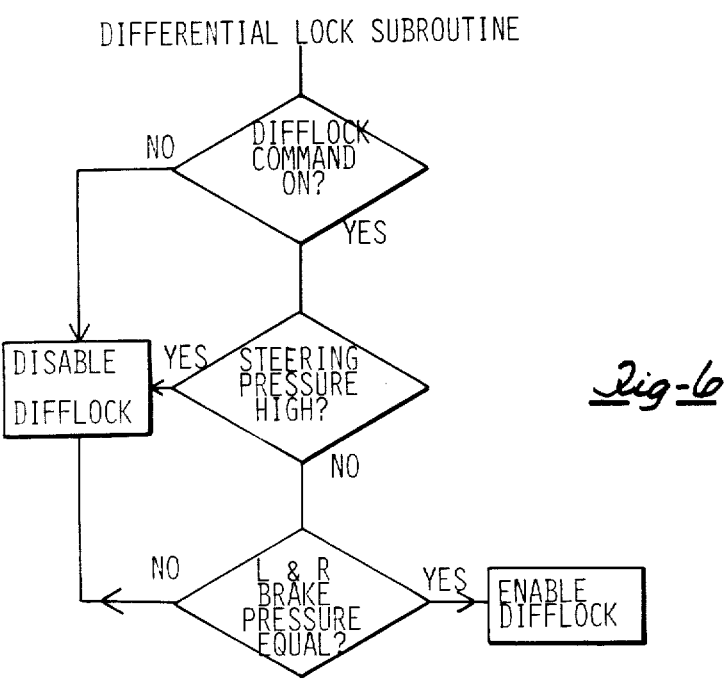
_Fig-6_

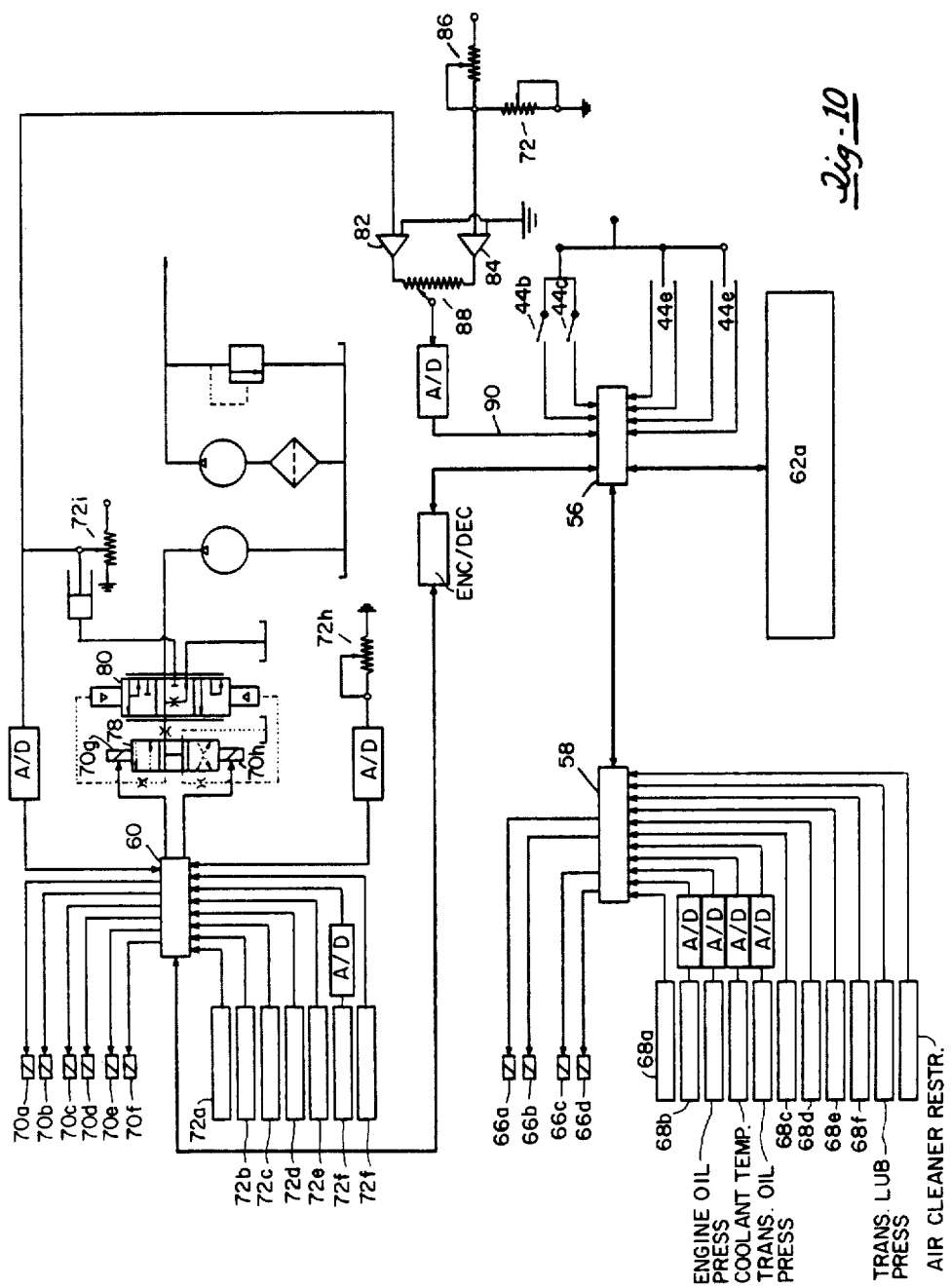

ELECTRONIC TRACTOR CONTROL

FIELD OF THE INVENTION

This invention relates generally to tractor control systems, and more particularly to systems providing a unified control of a plurality of subsystems within a tractor, in response to various subsets of sensed operating conditions and operator control settings.

PRIOR ART

Prior art control systems generally relate to individual ones of a plurality of subsystems associated with a tractor, with coordination of the several subsystems left to the operator. Thus, electronic draft control systems for hitch positions are known and available in 4000 series tractors produced by Massey-Ferguson.

Similarly, diesel fuel injection control is known, as is a system for electronic gear shifting. The latter, for example, is disclosed in the June 26, 1980 issue of Machine Design, page 40.

The prior art, however, does not provide a unified control, coordinating the various conditions sensed by the control systems for controlling one or more subsystems in response to one or more subsets of conditions in accordance with a predetermined target relationship to be achieved among the several conditions.

SUMMARY AND OBJECTS OF THE INVENTION

It is accordingly an object of the present invention to provide a unified control system for controlling any one of a plurality of control subsystems in response to a number of operating conditions and operator control conditions.

It is a further object of the invention to provide a unified control system which is governed by microprocessor technology, including storage means for relationships to be achieved among various of the conditions monitored by the system.

Still another object of the invention is the provision of a distributed processing network for controlling a number of subsystems in response to predetermined relationships to be achieved among a number of sensed conditions.

Yet another object of the invention is the provision of a unified control system wherein a number of control subsystems may be controlled and activated simultaneously in response to signals generated by individual processing units provided therefor.

It is yet a further object of the invention to provide a distributed, unified control system wherein communication among its components is made substantially insensitive to electromagnetic or radio frequency interference.

In accordance with the foregoing objects, the present invention provides a unified control system for a plurality of tractor subsystems. The control system includes a plurality of sensing means for several conditions of the tractor, indicative of actual and operator designated control states of the subsystems. Storage means are provided for storing a number of target relationships desired to be achieved among several subsets of the sensed conditions, and for storing the decision parameters for selection of appropriate control actions, and further for storing program instructions for controlling the subsystems and for implementing the selected control actions. Processing means is provided in the invention, including therein comparing means for comparing the condition signals with a particular target relationship from the storage means. Additionally, a programmable selecting means is provided for causing the comparing means to compare another subset of the conditions with an appropriate target relationship. Finally, actuating means are provided responsive to the comparison means for actuating at least one of the subsystems.

The above and other objects, features and advantages of the present invention will be apparent from the specification when read in conjunction with the following drawings.

BRIEF DESCRIPTION OF THE DRAWINGS

FIG. 1 shows a basic system in accordance with the invention.

FIG. 2 illustrates a possible configuration of a microprocessor based controller of the invention.

FIG. 3 shows a distributed processing embodiment of the invention.

FIG. 5 shows a particular control system usable with the present apparatus.

FIG. 6 illustrates a flow chart for a subroutine used in the present invention.

FIG. 10 is a view similar to FIG. 4 showing additional details.

DETAILED DESCRIPTION OF A PREFERRED EMBODIMENT

Figure 4:
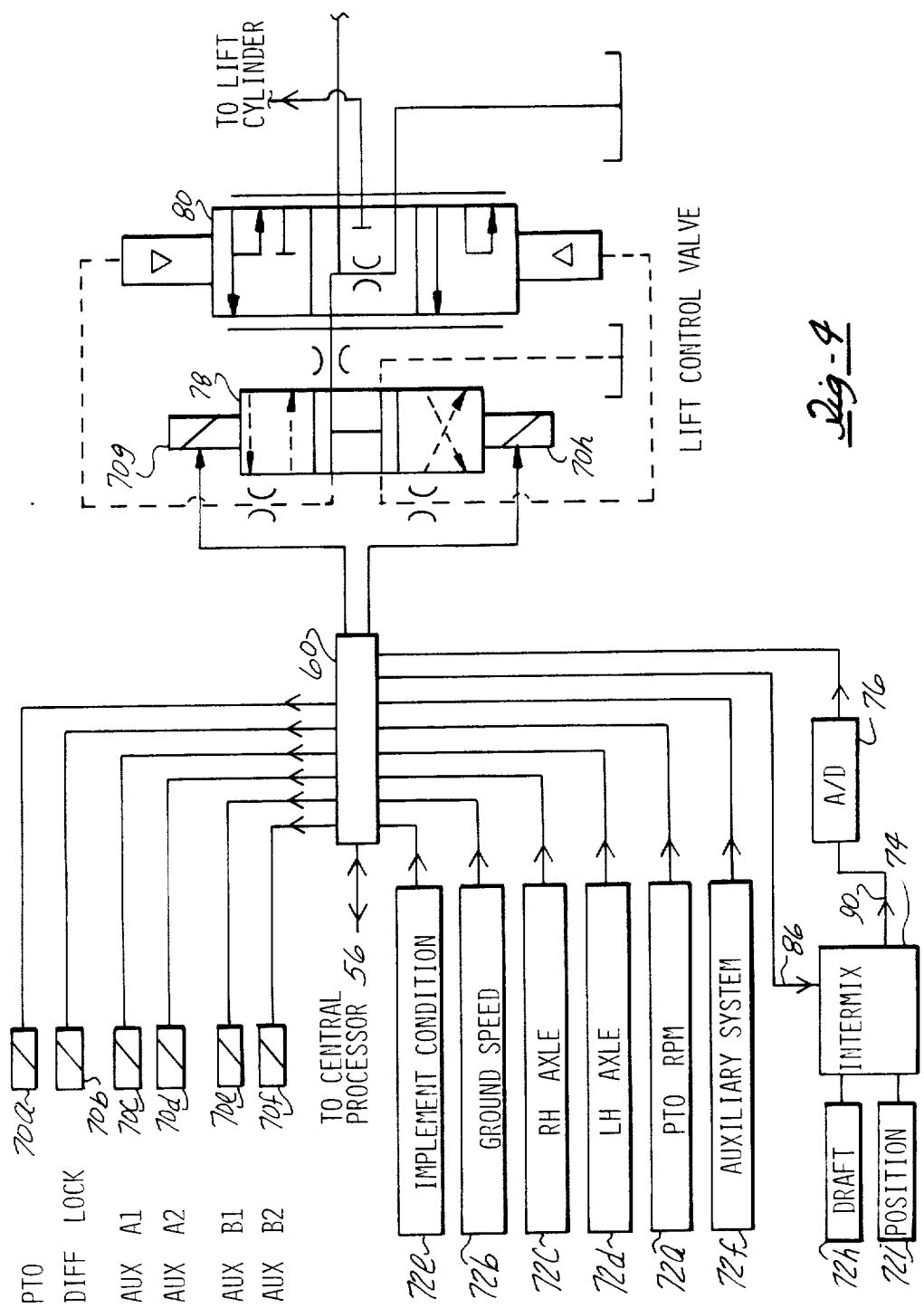
FIGS. 4, 7 and 9 show the interconnection of specific processors in the invention with particular sensors and control systems.

Referring now to FIG. 1, the present invention is seen to provide a central microprocessor based unified computer control system 10 for a plurality of subsystems 12, . . .14, each of which may have its own control. The various subsystems are interrelated in an operative tractor 20. Each of the subsystems 12 . . . 14 receives an electronic control signal from the central system 10 by transmission means 22, . . . 24. The subsystems effect various mechanical and electrical operations of the tractor and equipment associated therewith. The subsystems are symbolically shown as connected to the tractor by arrows 26 . . . 28. It is recognized, however, that the subsystems may form components of the tractor, or may relate to auxiliary devices connected thereto.

Plural sensors 32 . . . 34 are responsive to a number of conditions developed within the tractor 20 by operation of operator controls or of the several subsystems, for example. The conditions are not necessarily electrical, and accordingly the connection of sensors 32 . . . 34 to tractor 20 shown by arrows 36 . . . 38 is symbolic and not necessarily electrical. To complete the control loop, the central control system receives output signals from the sensors 32 . . . 34 along transmission means 40 . . . 42. As is described below, transmission means 22 . . . 24 and 40 . . . 42 may in reality comprise a single, time shared transmission means, and may provide for optical, rather than electrical communication of the signals. The present control system further receives a plurality of commands from operator controls shown at 44, by transmission means 46 . . . 48.

The microprocessor based computer control system 10 may comprise a single-chip microcomputer including its own internal storage, such as a device available under the designation MK 3870 from the Mostek Corporation, Carrollton, Texas. Alternatively, as shown in FIG. 2 a microprocessor 50 may be used in communication with one or more storage devices 52 . . . 54. The microprocessor 50 may communicate directly with the subsystems by transmission means 22 . . . 24 and may receive all the sensor outputs by transmission means 40 . . . 42. Some subsystems and some sensors may communicate directly with storage. It is appreciated, however, that such communication would add to the complexity and expense of the present control systems. The present system accordingly avoids such direct memory access.

In the presently preferred embodiment, a distributed processing capability is provided for the central control system as shown in FIG. 3. Specifically, a plurality of microprocessors is utilized. Each of the microprocessors may include internal storage. Alternatively, each of the microprocessors may be in communication with an external storage as shown in FIG. 2. The separate microprocessors may communicate with one another along a system bus or, as shown in FIG. 3, by way of a central microprocessor 56. In the system of FIG. 3, microprocessor 56 forms a centralized control and microprocessors 58 and 60 are effectively slaved to the central control processor 56. Each of the separate microprocessors may be connected to one or more subsystems and to one or more sensors. In FIG. 3 this configuration is symbolically shown as a connection of subsystems 62 and sensors 64 to central microprocessor 56, and similar connections of subsystems 66 and sensors 68 to one of the slaved microprocessor 58. A similar connection is further shown between subsystems 70 and sensors 72 and the second slaved microprocessor 60.

In the present environment, wherein some of the sensed tractor conditions may require transmission of an analog value to the appropriate microprocessor, it may be required to interpose analog-to digital converters between one or more of the sensors (64, 68 or 72) and the appropriate microprocessor (56, 58 and 60). Where more than one sensor requires transmission of an analog signal, the converters may be time shared in the sense that the several analog signals may be sequentially input into the converters under control of the microprocessor.

In the tractor control environment, a number of subsystems to be controlled are most easily accessed from the cab, and others are more easily accessed from the rear or the front of the tractor. Accordingly, under the present configuration, the central control processor 56 is centrally located within the cab. Processor 56 is used to send timing signals to the other processors, and to address information to the storage units associated (either internally or externally) with those subordinate processors, thus generally directing the operation of and communication with the slave units. Processor 58 may be used, for example, as the engine control unit, and is located in the forward engine compartment. Such a location enables less circuitous, hence less expensive communication with information sources in the engine and with subsystems operative within the vicinity of the engine compartment. Additionally, the integrity of the firewall requires fewer violations for passage of communication paths among processor 58, subsystems 62 and sensors 64. Slave unit 60, on the other hand, may be located at the rear of the tractor and may communicate with various sensing means and with subsystem actuators found in the rearward portion of the tractor. Again, fewer passages are thus required for communication among processor 60, subsystems 70 and sensors 72. Instead, a single path is provided from the engine to the cab for processors 58 and 56 to communicate. Similarly, a single path connects the rearward section of the tractor and the cab, for communication between processors 60 and 56. For more or less complicated systems, greater or smaller numbers of slave processors may be used. Alternatively, several independent processing control systems may be provided.

Communication among the several microprocessors accordingly permits usage of information concerning a particular condition of the tractor in controlling any specific subsystem which may respond thereto. Thus, for example, engine load information may be utilized for controlling the shifting of a hydraulic transmission, for determining desirability of increasing PTO slip, or for controlling fuel injection timing and duration.

The specific subsystems controlled by the present unified control system are listed in Table I, while the tractor conditions sensed by the present system are listed in Table II.

TABLE I

| Controlled Subsystems | |
| --- | --- |
| Hitch Position and Draft Control | Rear |
| Independent Power Take Off | Rear |
| Differential Lock | Rear |
| Implement Control | Rear |
| Auxiliary Systems | Rear |
| Diesel Control | Front |
| Hydraulic Transmission | Front |
| Display | Center |
| Air Conditioning | Center |

TABLE II

| Tractor Conditions | |
| --- | --- |
| Draft | Rear |
| Position | Rear |
| PTO RPM | Rear |
| Axle Speed (Right, Left) | Rear |
| Implement | Rear |
| Auxiliary | Rear |
| Engine RPM | Front |
| Torque | Front |
| Brake Pressure (Right, Left) | Front |
| Steering Pressure | Front |
| Ground Speed | Front |
| Air Conditioning | Center |

The controlled subsystems may receive actuating signals for solenoids which can control switches or hydraulic valves. That is, output binary signals may be used without conversion to drive and control the several subsystems. It is conceivable, however, that additional subsystems may be added to the list of Table I, in which analog values will be required. In that event, the control signals would have to undergo a digital-to-analog conversion prior to application to the subsystem. Tables I and II list the subsystems and conditions in terms of the specific microprocessor with which they communicate.

Table III shows operator commands

TABLE III

| Operator Commands |
| --- |
| Hitch Position and Draft |
| Pto |
| Differential Lock |
| Implement |
| Auxiliary |

TABLE III-continued

Operator Commands

Display Selection processed by the present system. The commands are generated at various control switches and levers located in the tractor cab, and thus are directed to the central microprocessor 56.

It is noted that while some of the conditions sensed by the various sensors are qualitative in nature (e.g., indications of pressure) others are quantitative (e.g., load as indicated by exhaust temperature, draft and depth, and various speeds). The qualitative conditions are each easily transmitted by a single binary signal. The quantitative conditions require analog signals, thus analog-to-digital conversion. However, some of the analog signals, specifically the speed measurements, may be transmitted either by a converted digital signal or directly in terms of pulses representative of rotation of a toothed disc for example. With the aid of the internal timers of the microprocessors, the pulses may be counted for a predetermined time period to provide internal conversion of the speed values to digital values.

FIG. 4 shows the interconnection of the various actuating solenoids of subsystems activated by the rear microprocessor 60 and the several sensors indicating tractor conditions to the microprocessor. FIG. 4 shows one of these subsystems in detail as an illustration of the connections for the several subsystems involved. Thus, microprocessor 60 is shown as receiving input signals from the several sensors 72a through 72f, representing IPTO RPM, ground speed, right axle speed, left axle speed, implement condition and a condition of an auxiliary system which may be connected to the tractor. Further, an input signal is provided from an intermix draft and position control system. The intermix signal is generated by a circuit 74, which receives as its inputs the draft sensor output 72h and position sensor output 72i. Such systems are known in the art, and provided, for example, on the 4000 series tractors produced by Massey-Ferguson. One embodiment of such a system, which provides for positive position control, full draft control, or a combination of the two, is shown in FIG. 5, discussed below.

The intermix system shown in FIG. 5 provides an analog signal which is, accordingly, converted to digital form by analog-to-digital converter 76. The output of converter 76 may be transmitted to the microprocessor 60 either as a parallel, multi-bit signal received by an input port, or as a serial transmission of a number of bits which are received in a register within the microprocessor for serial-to-parallel conversion therein.

The received signals representative of the several conditions monitored by the rear processor are compared against desired operating characteristics which are used as targets for the tractor operation. Such characteristics may be stored in a storage portion of the microprocessor or in an associated storage as shown in FIG. 2. The desired operating conditions may be established or varied by operator controls 44 within the tractor cab. Comparison of the relationship among a subset of the tractor conditions with the desired, or target relationship stored in memory is used to provide activating signals for various of the subsystems under the microprocessors' control.

The microprocessors utilized in the central control system include internal timers therein. It is possible, however, that timing signals may be provided by the central processor 56, or that the slave processors operate independently thereof and receive timing control signals for transmission of data to the central unit. In the preferred embodiment, the central unit 56 provides address signals to the slave units to indicate particular conditions that are needed, either by the central or by the other microprocessors. Typical handshaking signals are also similarly communicated between the central processor 56 and slave unit 60 in order to provide for accurate transmission of data from one to the other. Where a slave unit requires condition information from the central processor or from an alternate slave unit, a request signal may be sent to the central processor with an address indicating the specific condition needed. The central processor accordingly determines whether it or the other microprocessor receives the needed signal. In the latter case, the central processor requests the alternate slave unit to provide the condition information thereto. Subsequently, upon receipt of the desired information or upon determination that such information is input directly to the central unit, the requested condition information is transmitted to the requesting slave unit which continues with its processing to obtain the output control signal.

Slave unit 60, for example, which has control over the hitch lift cylinder, the power take off, the differential lock, and the implement and auxiliary system controls, is shown in FIG. 4 as outputing signals to solenoids 70a (to control power take off) 70b (to control differential locking), 70c and 70d (to control a spool valve for an auxiliary system), and 70e and 70f (to control a spool valve for a separate auxiliary system or for an implement control). As a specific example of such control, solenoids 70g and 70h are shown as receiving signals from the rear processor 60. These solenoids are used to control the pilot section 78 of a lift control spool valve 80 used to control the lift cylinder for the tractor hitch.

Referring now to FIG. 5, which illustrates a particular embodiment of an intermix control, the signals from draft sensor 72h and position sensor 72i are shown as provided to difference amplifiers 82 and 84. While FIG. 5 shows the sensor signals as being generated by potentiometers, this is for convenience only. While the preferred embodiment utilizes linear variable displacement transformers (LVDT), other sensors, such as capacitive sensors, may be utilized. A gain control 86 is shown in the FIG. 5, and is used to vary the slope of the control characteristic relating spool position as a dependent variable with draft increments as the independent variable. A signal indicative of the setting of the depth control is provided to the intermix circuit 74. Such a signal may be provided directly from the operator control which may be a potentiometer or LVDT, for example.

Alternatively, processor 60 may request the value of the control signal periodically from central unit 56. The control or command signal, converted from analog-to-digital form prior to transmission by processor 56, is then converted to analog form subsequent to its receipt by processor 60.

In either case, the analog signal is provided to intermix circuit 74 and is shown as entering that circuit on line 87. A potentiometer 88 is used to select any ratio of draft to position response to provide the output signal on output line 90. An analog signal is output on line 90, which is then converted to digital form in converter 76 prior to transmission to the slave unit 60 for control of spool valve 80.

It is appreciated that the analog circuit shown in FIG. 5 may be replaced entirely by digital processing within the processor 60. In this case the outputs of draft and position sensors 72h and 72i are initially converted to digital form for comparison within processor 60 with the digitized form of the depth control, prior to multiplication by mixing ratios for provision of an output signal for controlling the lift cylinder.

In either digital or analog form, the example discussed above illustrates the utilization of a subset of all conditions, indicative of operator setting (position control, intermix control) and tractor condition (draft or position) to provide a control signal for activating a control subsystem (hitch control) of the system.

Processors such as the MK 3870 include internal timers used herein for cycling the system, upon completion of an operation as described above, to examine a different subset of operator and/or tractor conditions for comparison with a different desired target relationship which is also stored in memory. Such storage may be in the form of instruction storage, wherein a subroutine is executed and a comparison made, a decision being reached based upon the results of such a comparison, and an appropriate system activated. For example, to determine whether the solenoid 70b, activating the differential lock, is to be energized, the subroutine shown in FIG. 6 may be executed.

As shown in the FIG. 6, upon detection that the command for energizing the differential lock (or difflock) is on, and that steering pressure is low and brake pressures on right and left wheels are equal, the differential lock solenoid is activated. Upon detection either that the difflock command is off, that steering pressure is high (indicative of a steering maneuver) or that the left and right brake pressures are unequal (similarly indicative of a desired steering turn) the difflock solenoid is disabled. The steering pressure sensor may be provided with a particular threshold value prior to providing a response. Such a threshold is desirable to prevent deactivation of the differential lock in response to minor steering adjustments. The steering pressure and brake system pressure for both left and right wheels are detected by sensors which provide information on those conditions to the engine, or front processor 58. In order to control the difflock solenoid, processor 60 requires the data relating to the steering and brake system pressures. Accordingly, processor 60 will request central processor 56 for the data. The central processor includes a subroutine to determine the location of the specific information and accesses the appropriate processor, in this instance processor 58. Processor 58 transmits the information to processor 56 for retransmission to processor 60, where the information on steering and brake conditions is utilized in the subroutine of FIG. 6. Upon determination of the result of the subroutine, a signal (high or low) is sent to the differential lock solenoid 70b for activation or deactivation of the locking mechanism. The solenoid activates a hydraulic clutch for locking one of the driven pinions to the differential housing when it is determined that the differential lock should be activated.

Figure 8:
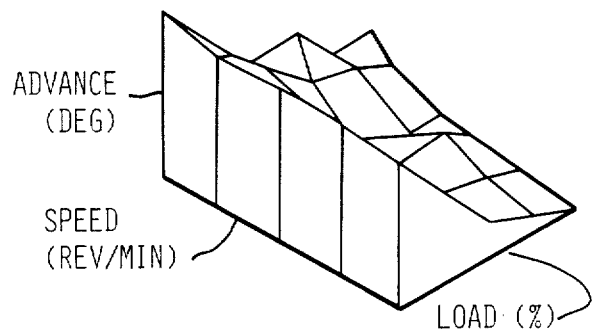
FIG. 8 shows a target relationship, or map, among various conditions of the subsystems, illustrative of relationships stored by the present control system.

A more complicated situation arises in performing the governor function wherein the engine processor 58 provides a signal energizing a solenoid in accordance with a complex mapping function relating advance angle to engine speed and load. Such a mapping function is disclosed in "An Overview of the Electronic Controls for Passenger Car Diesel Engines"; (Trenne et al), published in the proceedings of the "30th Annual International Conference on Transportation Electronics", SAE catalog Number SP-90. The timing map is shown in FIG. 8 herein. The complex function may be stored as a sequence of break points of a three dimensional surface.

Figure 7:
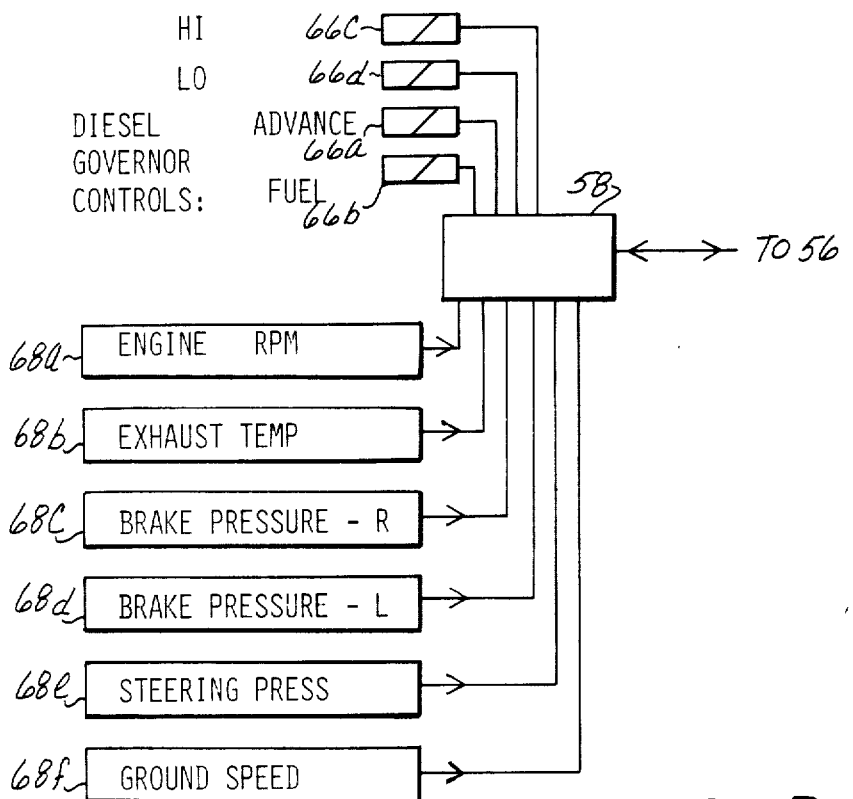

The present apparatus, rather than measuring engine load by direct measurement of torque, utilizes the less expensive approach of measurement of exhaust temperature by a thermocouple, for example. Such temperature varies with the engine load, and is a relatively accurate indicator thereof. As is known in the art, the position of the rack in an injection pump will determine the rate of fuel flow, while the cam position under the pumping piston may be used to determine timing of injection. Thus, upon a comparison of engine RPM and exhaust temperature with an appropriately modified map from storage, processor 58 provides an output signal to the diesel governor control solenoid as shown in FIG. 7 to control cam and rack position. A processor controlled diesel pumping and advancing system is disclosed in SAE technical paper No. 800167 "Electronic Control of Diesel Passenger Cars", presented at Congress and Exposition in Cobo Hall, Detroit, February, 1980.

FIG. 7 generally shows the front processor 58 as receiving input signals from sensors 68a through 68f, indicative of the following tractor conditions: engine RPM, exhaust temperature, right brake pressure, left brake pressure, steering pressure and ground speed. The latter is preferably detected with the aid of a radar detection instrument thereby permitting the present system to operate with actual ground speed, rather than calculated ground speed which may be obtained by counting the rotations of the ring gear through a sensor connected to the rear processor 60, or alternatively the summed rotational speeds of the front wheels which would be detected by sensors associated with the front processor 58.

In operation, an operator sets the engine RPM by a control which varies the adjustment of the rack and cam in the injection pump. Upon detection of a change from the set engine RPM, processor 58 executes a subroutine to determine whether the advance angle of the injection pump is in conformity with the map stored in memory. The engine RPM and exhaust temperature are used to locate a specific point on the map, and the appropriate advance angle is determined therefrom. The solenoid activating the cam positioner is thus provided with an appropriate signal until the actual operating conditions match the targeted operating conditions as represented by the stored map. Similarly, the fuel delivery adjustment is made as a function of engine load, measured by engine exhaust temperature.

Solenoids 66a and 66b, which are used to control the appropriate positioning of the rack and cam within the fuel injection pump, may also be controlled to keep PTO RPM at a predetermined constant level. Thus, a subroutine is provided in storage of processor 58 for responding to a command to activate the PTO at a particular speed. Specifically, in executing the subroutine, processor 58 first requests information from central control processor 56 on whether the appropriate PTO command is in effect. Upon receiving confirmation from processor 56 that the command is active, and the speed setting therefor, the PTO RPM is obtained from processor 60 by communications through central control processor 56. Additionally, the speed setting information is used to address a particular location in storage for accessing a particular one of several stored reference, or target values for PTO RPM. In the event that the measured PTO RPM differs from a stored constant value therefor, engine RPM may be altered by control of solenoids 66a and 66b in order to maintain the appropriate PTO RPM. At the same time, a flag is set to disable the engine RPM governor function. Further, in view of the available data and controls, an optional feature of the system is the determination of PTO slippage by comparison of engine RPM and PTO RPM and verification of the relationship therebetween as being equal to some fraction. In the event of excessive slippage, PTO may be disengaged.

The foregoing example illustrates the utilization of the present system to control any one or more subsystems of the tractor in response to different subsets of the set of operator controls and sensed subsystem operating conditions. The diesel governor controls are shown to be controllable either in an ordinary governor fashion, responsive to engine speed and to load, or in response to PTO activation and speed. Thus, it is seen that specific control subsystems may respond to different subsets of sensed and operator controlled conditions.

A further system controlled by the present unified control system is the multi-range transmission, as is used in the 2000 series tractors of Massey-Ferguson and described in the U.S. Pat. No. 3,799,003, assigned to the assignee hereof. Such a transmission includes an eight speed gear box coupled with a three speed planetary input gearing mechanism which is hydraulically shifted to provide a high speed input when a high speed clutch pack is engaged, a low speed input when a low speed clutch pack is engaged, and an intermediate input when both clutch packs are disengaged. Either solenoid 66c or solenoid 66d, shown in FIG. 7, is activated by processor 58 to engage the appropriate clutch pack. A feature of the three speed planetary input mechanism is its shiftability under torque. The present unified control system accordingly provides for activation of one of solenoids 66c or 66d in response to predetermined conditions of exhaust temperature and engine RPM, stored in processor 58. It is thus seen that the same subset of conditions may be utilized to control any number of controlled subsystems. In the present example, engine speed and load may be compared, in one subroutine, with a first function to determine control of fuel flow and timing, and may be compared in a second subroutine, with a second mapped relationship to provide control of a transmission.

Figure 9:
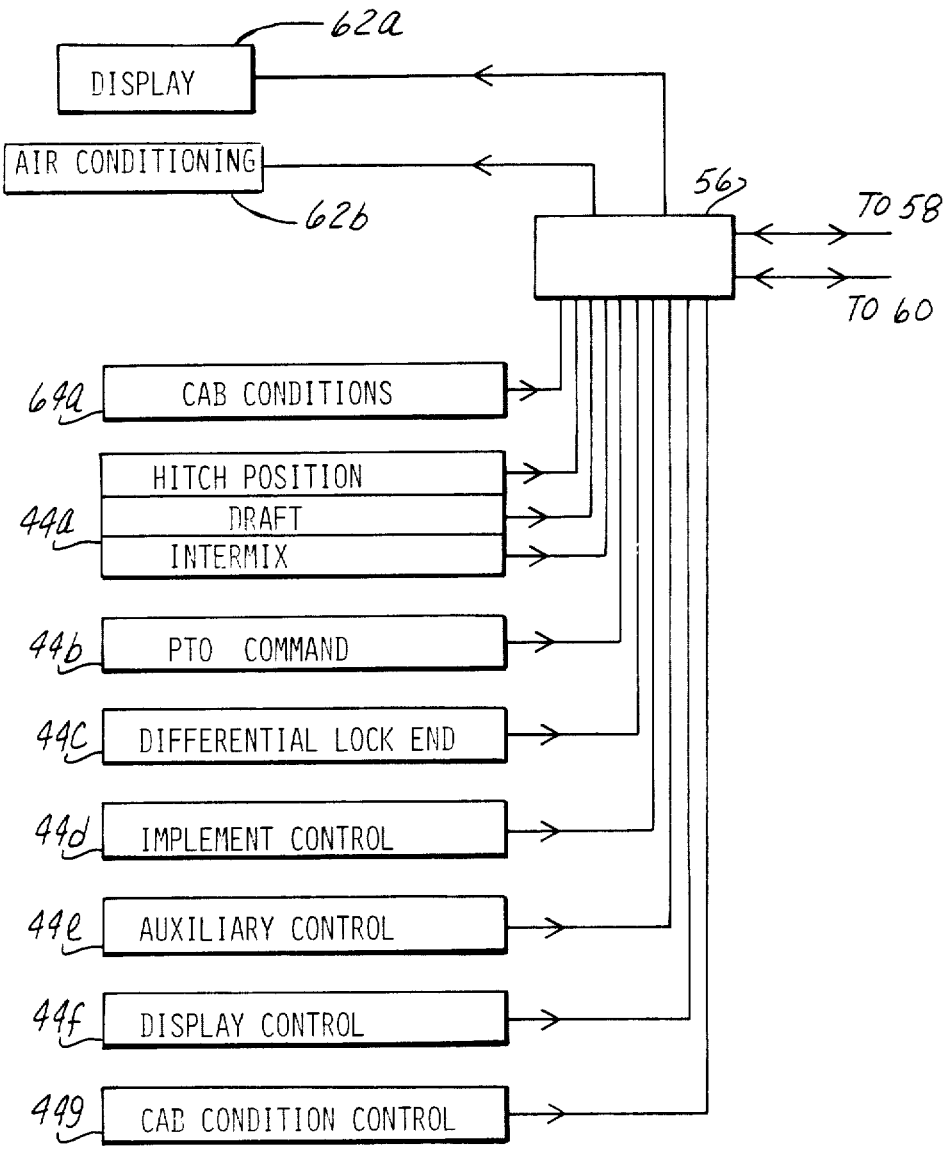

As shown in FIG. 9, the central control processor 56 includes communication paths to processors 58 and 60, and additionally receives signals from cab operator controls 44a through 44g, controlling hitch position, draft, intermix, IPTO, differential lock, implement control, auxiliary control, and display. Cab conditions may be sensed at 64a to provide an input signal to the processor.

Output signals from the processer 56 control various subsystems, in the present embodiment as including a display system and an air conditioning system shown at 62a and 62b.

The display system may provide a single digital display in the cab for displaying one of several engine functions, such as engine speed, ground speed, measured PTO speed, temperature conditions, wheel slippage, and the like in response to operator selection of the parameter for display. The IPTO command 44b is given by operator actuation of a switch, while the differential lock command is given by a pressure sensitive switch which is in the off state when pressure is low. Other switches may be used, such as capacitive or temperature sensitive switches. The auxiliary control 44e may be used to provide controls for sprayers, winged implements, gauge wheel control or the like. As shown in FIG. 4, any auxiliary device may be controlled by solenoids 70c through 70f. The provision of two solenoids for each auxiliary device is intended to provide for double acting cylinders, requiring one solenoid for extending the cylinder, and the other for retracting the cylinder. Any feedback signals from the auxiliary systems are provided by sensor 72f in FIG. 4. Similarly, control of an implement is indicated at operator control 44d in FIG. 9, and a feedback signal provided by sensor 72e in FIG. 4. Where an auxiliary system requires but one controlling solenoid, it is appreciated that the number of auxiliary subsystems controlled by solenoids 70c–70r may be doubled.

It is possible to use the solenoids for swash plate control to control the output of a variable displacement pump for spraying liquids. Such systems may also be used for spraying granular material by controlling the speed of a spraying motor in response to the variation of the swash plate angle of the pump.

Implement control may rely on a solenoid similar to that shown in FIG. 8 of the SAE paper 800167, previously cited, wherein the force developed by the solenoid is proportional to the applied current. Such a solenoid may be used to control the pump swash plate thereby to control rate of flow of hydraulic fluid, or for controlling spool position. Accordingly, the implement sensor signal might be an analog signal used with an analog-to-digital converter prior to transmission by the rear processor. Other sensor signals which might be analog in nature include the auxiliary system condition detector by sensor 72f, and the exhaust temperature condition detected by sensor 68b.

As previously discussed, draft and position signals may be either analog or digital, and are presently contemplated to be analog. While the present discussion is in terms of closed loop feedback control, in fact, specific subsystems might be controlled in an open loop fashion. Thus, the use of a swash plate control for a spraying application for either liquid or granular matter, may be independent of any feedback signal, and may be solely dependent on ground speed in order to maintain a constant distribution rate. An auxiliary control may provide an analog signal for storage in processor 56. Upon programmably cycling to the control function for the specified auxiliary system, processor 60 thus receives the ground speed signal from processor 58 by way of central control processor 56, and compares the same with the stored speed setting for the auxiliary system. Deviation from the stored value results in actuation of an appropriate solenoid to increase (or decrease) the spraying rate by a factor proportional to the percentage speed deviation, and storage of the measured speed as the new value of speed setting. Upon first selecting the spraying function command, a particular rate (selected) by the operator) is stored as the target spray value for a particular speed. These values are obtained from a read-only-storage and stored in read/write memory as the current values of rate and speed settings, and the swash plate controlled to achieve the spray rate. In succeeding control cycles, as the speed is found to differ from the stored speed setting, the spray rate setting is appropriately altered as described above, and stored in scratchpad or read/write memory. The appropriate command, based on the new value of spray rate, is then provided to the swash plate. In the sense that controlling the auxiliary solenoids in response to ground speed does not affect the ground speed, it is seen that control is, indeed, in an open loop manner.

The control signal for the swash plate should typically be an analog output of a driving amplifier. Such a signal is provided after a digital-to-analog conversion of the output signal at the microprocessor. It is possible to control swash plate angle, however, by providing a sequence of step signals, or pulses, rather than an analog value. That is, serial control for a particular subsystem may be provided by the present apparatus. Such serial control may be effected by referring to the control subroutine several times in a particular cycle. That is, in standard operation, where a high or low signal is provided, to a controlled system, the internal timers of these various microprocessors are used to cycle through the program causing each subroutine to be executed in turn. As previously mentioned, the central control processor timer may be used as the master clock for synchronizing communication among the several processors. For execution of subroutines relating to control of systems by a processor which is the sole processor receiving any condition information pertinent to the control of the function, no interprocessor communication is required, and accordingly the slave processor timer may be used to control operations. Otherwise, the master timer in the central control processor may be used to synchronize each of the processors. For transmission of an analog signal to a controlled system in a serial manner, the transmitting processor establishes a register including a count of the number of pulses required to be transmitted to the controlled system. The count is decremented upon transmission of each pulse, and stepping of the transmitting processor to the next function to be controlled is halted until the register count is decremented to zero. Alternatively, a series of interrupts may be generated by the processor to assure that between the execution of the specific subroutine during a first cycle and the execution in the next cycle, the appropriate number of pulses are transmitted (decrementing the register count with each such transmitted pulse). A similar technique may be used to accept an analog signal from a digital-to-analog converter in a serial mode. Thus the swash plate angle, for example, which is a linear function, may be achieved by transmission of a sequence of pulses thereto in response to determination of the appropriate control signal.

Other functions provided by the present unified control include an override of the draft control system by determination of the difference between actual ground speed and calculated ground speed. That is, by determination of the existence of a predetermined amount of wheel slippage. Rather than permitting the draft response to cause the implement to be lowered, the present apparatus will override the draft control system in response to such calculation conducted under control of a subroutine which may be stored in the processor 60.

In operation of the multi-power transmission, previously described, the front processor 58 responds to a drop in RPM by comparing the exhaust temperature, indicative of engine load, to predetermined ranges. If the exhaust temperature is high, the transmission may be down shifted to raise engine RPM. If, however, it is determined that exhaust temperature is in a reasonable or average range, a signal is generated for transmission to the diesel governor control, to provide more fuel to the cylinders.

While not shown in FIGS. 7 or 9, a monitoring section may be provided to provide indications and warnings reflecting abnormal conditions of the engine. Thus, sensors may be provided for various pressure limits within the engine, torque limits, temperature limits and the like, and individual alarms and displays may be activated thereby. Upon activation of such an alarm, a timing sequence may be initiated which causes shutdown of the engine subsequent to passage of a predetermined period of time, sufficient to permit the operator to drive the vehicle off a highway, for example.

Yet a further feature of the present invention is the use of learning programs for repeating settings of individual controls during repeated passes with the same implement. Thus, by operation of a "learn" push button, a subroutine may be executed in which the settings of the various controls during a first pass with a tractor are stored in several registers or in a scratch pad memory available with the microprocessor. Upon repeated passes, the operator depresses a "playback" pushbutton, initiating execution of a second subroutine during which the settings of the various controls are read from memory and caused to control the effected subsystems. Thus, by depressing a single push button, the operator may place the tractor into the desired gear settings, engine RPM controls, hitch position and draft settings, and the like.

In view of the identical nature of the subroutines used for controlling the operation of different tractors having different engine sizes, the present system is further combined with a manually setable switching apparatus for tailoring its operation to a specific engine and/or tractor configuration. That is, a plurality of switches, available as a "Dip" switch, is set to a particular configuration. Eight switches may be set to any of 64 on and off configurations. These switches are interrogated by the microprocessor to determine which mapping function is withdrawn from memory therefore controlling, for example, the fuel flow and advance. For a particular engine size, specific implementation, and transmission, the switches are set to a particular configuration. Upo-nintiating of any of the control subroutines, the appropriate target relationship is selected to provide control for the specific engine in accordance with its particular characteristics. The switches may be set to conform to engine size, capacity, power settings requiring difference advance characteristics, and tire size, for example. The appropriate shift points for the multi-power transmission, as well as timing of maps and other decision points, are thus provided for the specific engine. The "Dip" switch control is preferably located away from operator access and from the possibility of inadvertent resetting of the switches.

The several microprocessors, as well as condition sensors and control subsystems, can communicate over a network of fiber optics, thereby providing communication immune from electromagnetic or radio frequency interference. Further, communication is on a time shared, or multiplexed basis, whereby a single pair of wires may be used to communicate between any pair of microprocessors. Thus, firewalls need not be disrupted for passage of complex wiring harnesses, and communication is achieved over a simplified network. This system accordingly utilizes a plurality of optical encoders and decoders and interfaces between the various microprocessors (not shown).

The present processing distribution contemplates the use of a processor whose output controls a particular system to make the comparisons and to derive any control signals related to that system. It is, of course, equally possible to distribute processing capability to the processor which receives the feedback signals from a particular function rather than to the one controlling the function.

The preceding specification describes by way of illustration and not of limitation, a preferred embodiment of the invention. It is recognized that modifications of the disclosed embodiments will occur to those skilled in the art. Such modifications and equivalents are within the scope of the invention.

What is claimed is:

1. A unified control system in combination with a tractor having a cab, an engine, and a plurality of controlled subsystems including a rear-mounted implement hitch; said unified control system including a principal control unit having a principal microprocessor associated with the cab of said tractor first and second subservient control units each having operating condition sensors and a subservient microprocessor, said first subservient control unit being associated with the engine of said tractor, and said second subservient control unit being associated with the rear-mounted implement hitch of said tractor, and each of said control units controlling at least one associated subsystem in response to sensed operating conditions;

communication link means connecting said control units to each other and capable of transmitting data descriptive of said sensed operating conditions from the subservient control units to said principal control unit;

data requesting means associated with one of said subservient control units for requesting from said principal control unit data descriptive of an operating condition of a subsystem associated with the other of said subservient control units; and operating means associated with said one subservient control unit for generating control signals to an associated subsystem in response to said requested data.

2. A control system as recited in claim 1 wherein said communication links means fiber optics.

3. A unified control system as recited in claim 1 wherein said principal control unit includes means for receiving command inputs from a driver of the tractor, said unified control system being further characterized by said data requesting means associated with one of said subservient control units also being capable of requesting data indicative of said command input.

4. A method of providing unified control of an agricultural tractor having a plurality of sensors including position and draft sensors, and a plurality of controlled subsystems including an implement hitch, said tractor also being provided with means for establishing draft and intermix control signals, said method comprising the steps of:

(a) providing a central control unit having a microprocessor, a plurality of subservient control units each having a microprocessor, and storage means associated with at least one of said microprocessors;

(b) programmably selecting from data representing a plurality of target operating relationships among data representing subsets of operator designated tractor conditions and actual operating tractor conditions, and decision parameters for selection of control actions, stored in a storage means;

(c) determining which of said subservient control units senses a needed subset of said operating tractor conditions data;

(d) transmitting a request from the central control unit for said operating condition data to the determined microprocessor, (e) returning the requested data to said central control unit microprocessor, said returning step comprising the step of converting draft and position signals to digital form and of converting depth control and intermix control signals to digital form;

(f) providing said data to a subservient microprocessor for comparison with said selected target operating relationship or decision parameters;

(g) comparing said data with said selected target operating relationship or decision parameters, said comparing step comprising the steps of comparing said draft and position signals with said depth control signal in digital form, and multiplying the differences therebetween by a mixing ratio derived from the intermix control signal to provide an output control signal;

(h) obtaining results of the comparison;

(i) actuating, if necessary, at least one of said plurality of controlled subsystems in response to the results of said comparing step;

(j) selecting a further one of said stored target operating relationships or decision parameters; and (k) programmably repeating step c-j, thereby controlling each of said plurality of controlled subsystems.

5. The method of claim 4 wherein said agricultural tractor includes a differential lock controlled by a control signal, a fluid operated steering apparatus, and right and left hydrauliclly operated wheel brakes, the plurality of sensors including pressure sensors capable of determining steering pressure and right and left wheel brake pressure, said returning step comprises the step of determining a status of a differential locking control signal, determining the status of a steering pressure signal, and determining existence of an equality between signals representing right and left wheel brake pressures, said comparing step includes a comparison of said differential locking control signal with an Off status, and comparison of said steering pressure signal status with a high status, and said actuating step comprises the step of transmitting a signal to a differential locking solenoid for deactivating a locking mechanism in response to a favorable comparison result of a determination of inequality between said right and left wheel brake pressure signals.

6. The method of claim 4 wherein said agricultural tractor includes a governor controlled engine and a PTO, and wherein said returning step comprises the steps of determining existence of an operator setting commanding constant of PTO RPM and the speed setting therefor, obtaining current PTO RPM data, and using the speed setting for PTO RPM to address stored data,
   said comparing step including a comparison of said stored data with PTO RPM, and
   said actuating step including the steps of overriding the engine RPM governor and altering engine RPM.

7. The method of claim 4 wherein said agricultural tractor includes an engine and a PTO, and wherein said comparing step comprises the steps of comparing signals representing engine RPM and PTO RPM and verifying that the relationship therebetween equals a predetermined fraction, and
   said actuating step comprising the step of disengaging the PTO from the engine if the comparing step indicates excessive slippage between the engine and the PTO.

8. The method of claim 4 wherein said actuating step comprises, the step of transmitting of an analog signal to a controlled subsystem, including the substeps of
   establishing a register in the transmitting microprocessor, storing a count of a number of pulses required to be transmitted to the controlled subsystem, and decrementing the stored count upon transmission of a pulse to the controlled subsystem, and concluding transmission when the stored count is zero.

9. A method of providing unified control of an agricultural vehicle of the type having an engine provided with an exhaust and a transmission, said vehicle further having a plurality of controlled subsystems, comprising the steps of:
   (a) providing a central control unit having a microprocessor, a plurality of subservient control units each having a microprocessor, and a storage means associated with at least one of said microprocessors;
   (b) programmably selecting from data representing a plurality of target operating relationships among data representing subsets of operator designated vehicle conditions and actual operating vehicle conditions, and decision parameters for selection of control actions, stored in a storage means;
   (c) determining which of said subservient control units senses a needed subset of said operating vehicle conditions data;
   (d) transmitting a request from the central control unit for said operating condition data to the determined microprocessor;
   (e) returning the requested data to said central control unit microprocessor;
   (f) providing said data to a subservient microprocessor for comparison with said selected target operating relationship or decision parameter;
   (g) comparing with data with selected target operating relations or decision parameters, said comparing step comprising the step of comparing exhaust temperature data with a particular range therefore in response to detection of a drop in engine rpm;
   (h) obtaining results of the comparison;
   (i) actuating, if necessary, at least one of said plurality of controlled subsystems in response to the results of said comparing step, said actuating step comprising the step of either downshifting a transmission of said vehicle if the comparing step indicates the exhaust temperature is higher than the particular range, or of providing additional fuel to the engine if the comparing step indicates the exhaust temperature is within the particular range;
   (j) selecting a further one of said stored target operating relationships or decision parameters; and
   (k) programmably repeating steps c–j, thereby controlling each of said plurality of controlled subsystems.

* * * * *